United States Patent [19]

Straut

[11] 4,145,164

[45] Mar. 20, 1979

[54] PUMP FOR HYDRAULIC BRAKE ACTUATOR

[75] Inventor: John E. Straut, Mahwah, N.J.

[73] Assignee: Abex Corporation, New York, N.Y.

[21] Appl. No.: 830,023

[22] Filed: Sep. 2, 1977

Related U.S. Application Data

[62] Division of Ser. No. 675,820, Apr. 12, 1976, Pat. No. 4,083,436.

[51] Int. Cl.² ............................................. F04B 5/00
[52] U.S. Cl. .................................. 417/252; 417/253; 417/259
[58] Field of Search ............... 417/252, 259, 260, 305, 417/253

[56] References Cited

U.S. PATENT DOCUMENTS

| 2,547,055 | 4/1951 | Stephens | 417/259 |
| 2,948,222 | 8/1960 | Pine | 417/253 |
| 3,076,416 | 2/1963 | Schmidt | 417/260 |

FOREIGN PATENT DOCUMENTS

| 279681 | 11/1930 | Italy | 417/259 |
| 296305 | 6/1929 | United Kingdom | 417/253 |

Primary Examiner—Carlton R. Croyle
Assistant Examiner—R. E. Gluck
Attorney, Agent, or Firm—Kinzer, Plyer, Dorn & McEachran

[57] ABSTRACT

A hand pump in which the piston is double acting, incorporating a check valve to limit the manual force to operate the pump and having a pressure release valve actuated by the pump handle in home position.

3 Claims, 4 Drawing Figures

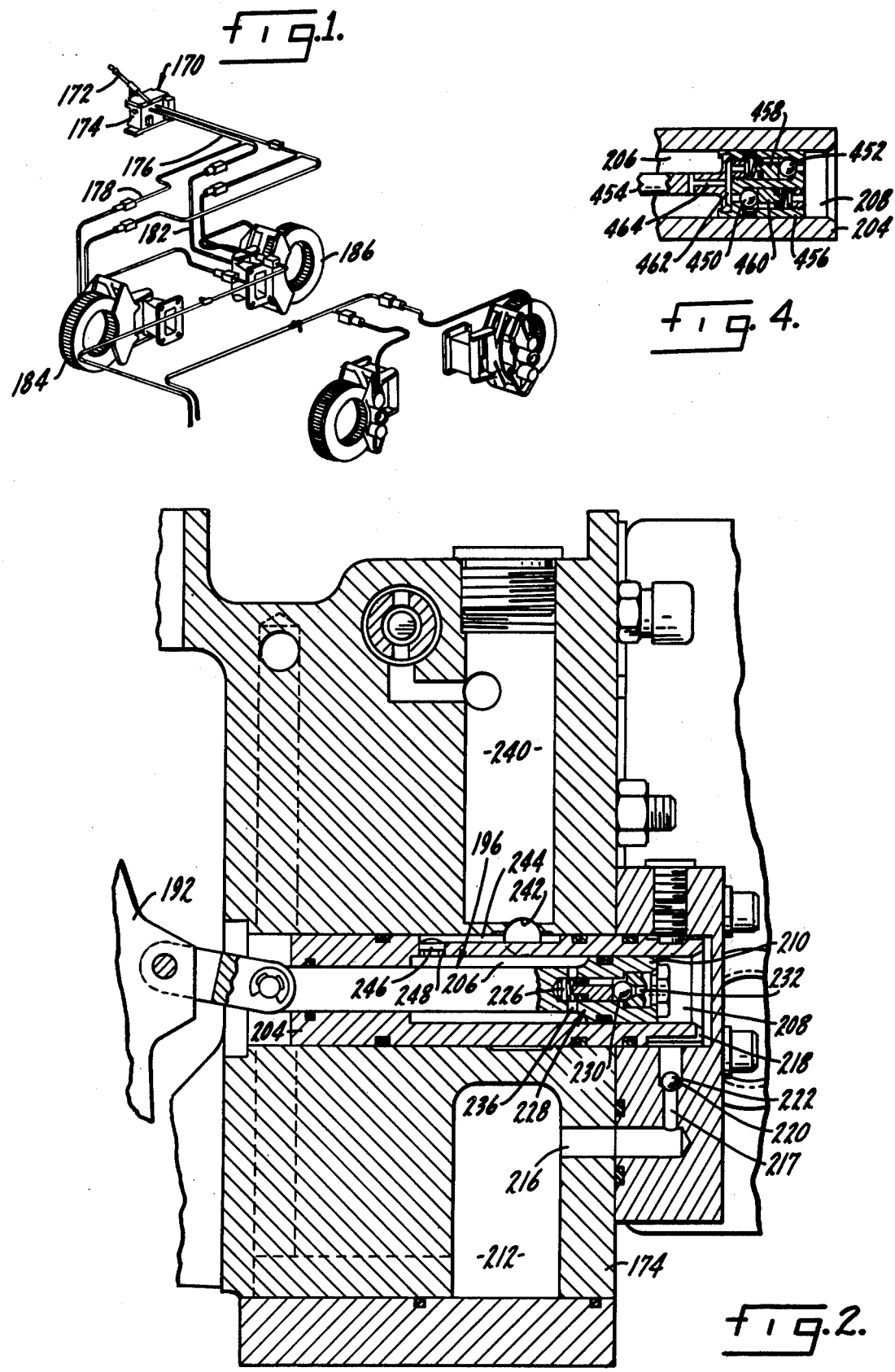

PUMP FOR HYDRAULIC BRAKE ACTUATOR

This is a division of application Ser. No. 675,820, filed Apr. 12, 1976, now U.S. Pat. No. 4,083,436.

This invention relates to brake apparatus and in particular to a hand pump for furnishing fluid under pressure to the brake actuator of a railroad car, for example.

In the drawing:

FIG. 1 is a perspective view of a brake system incorporating the hand pump of the present invention;

FIGS. 2 and 3 are sectional views of the hand pump on an enlarged scale;

FIG. 4 is a detail sectional view of a modified form of pumping piston.

Figure 3:
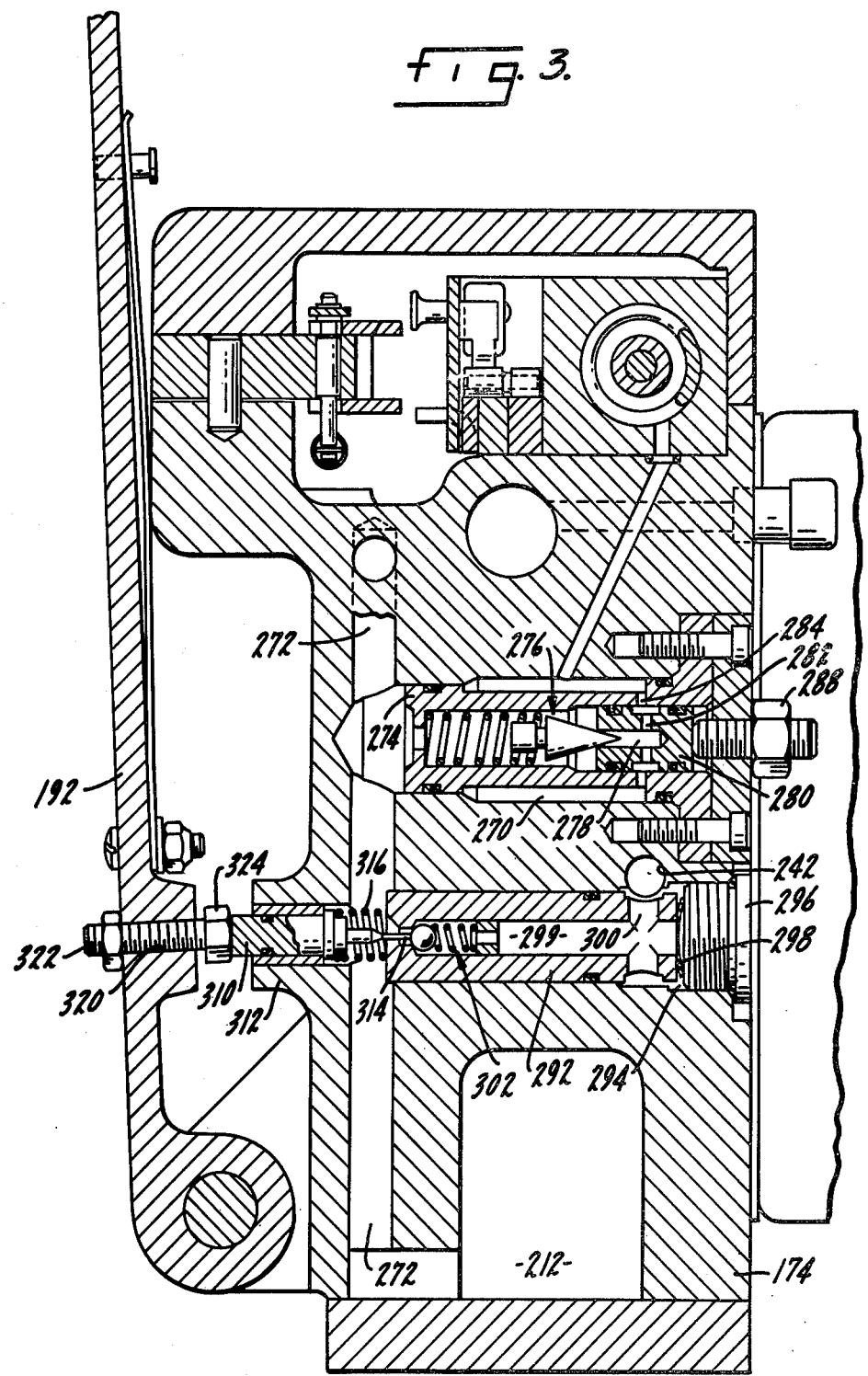

The brake actuator is more fully disclosed in application Ser. No. 675,820, filed Apr. 12, 1976, now U.S. Pat. No. 4,083,430.

The objects of the invention are to construct the pump piston so the manual force for operation may be limited and to automatically depressurize the pump chamber when the pumping handle is moved to home position.

THE HAND PUMP

Fluid pressure for engaging the brake and for operating the release piston, as fully disclosed in application Ser. No. 675,820, filed Apr. 12, 1976, now U.S. Pat. No. 4,083,436, is furnished by a hand pump unit 170, FIG. 1. Pressure is established by operating a pump handle 172 fulcrumed on a pump housing 174. Fluid under pressure for applying the parking brake is furnished by a conduit 176 connected to an outlet port on the pump housing. Conduit 176 has two branches 178 and 182 respectively connected to a port (not shown) of each of the two parking brakes associated with the two wheel discs 184 and 186, FIG. 1, on one side of the corresponding railroad car.

As shown in FIG. 3 the pump handle 172 is really an extendible arm of a lever 192 fulcrumed on the pump housing. A pumping piston 196 is connected to arm 192 as shown in FIG. 2. The arrangement is such that after a predetermined mumber of strokes the operator feels resistance and therefore piston 196 has created enough pressure to produce engagement of the parking brake with the desired force. The pumping piston 196 reciprocates within a sleeve 204, FIG. 2, secured in the pump housing. The internal bore of sleeve 204 is enlarged to provide a pair of chambers 206 and 208 which are separated by a head 210 on the piston.

The piston 196 is double acting and reciprocates above a reservoir 212 located within the pumping housing 174. When piston 196 is stroked in one direction, fluid is withdrawn from reservoir 212 and delivered to chamber 208;. When the piston is stroked in the opposite direction an additional quantity of fluid is pressurized for delivery to the brake actuator.

Chamber 208 communicates with reservoir 212 by way of passages 216, 217 and 218. Passage 217 is enlarged to provide a seat 220. A ball 222 sets in seat 220 to afford a gravity controlled check valve within the passage communicating chamber 208 and reservoir 212.

The head of the piston is provided with an internal chamber 226. A spring loaded check valve 228 is positioned in chamber 226 and is normally effective to dispose a ball 230 in closing position against a port 232 inside the head of the piston which communicates chambers 208 and 226.

Chamber 226 inside the piston head is communicated to chamber 206 by a cross-passage 236.

When piston 196 is moved to the left, FIG. 2, check valve 230 is forced closed, chamber 208 is expanded by virtue of the retracting piston head, ball check valve 222 rises and fluid is delivered from chamber 212 into chamber 208. At the same time fluid in chamber 206 is pressurized.

Conversely, when piston 196 is driven to the right, check valve 222 is seated, check valve 230 opens and fluid under pressure surges through port 232 and passage 236 into chamber 206.

Chamber 206 communicates with a large chamber 240 in the pump housing by way of a transverse bore 242 which in turn communicates with a reduced section 244 of sleeve 204; a check valve in the form of a flap 246 is arranged in a port 248 which communicates the reduced area 244 with the pumping chamber 206.

The entire system is normally filled with hydraulic fluid and hence when fluid in chamber 206 is pressurized, flap valve 246 is opened to pressurize chamber 240.

RELIEF VALVE

To protect the system from excess pressurization, a relief valve senses the pressure in chamber 240 and drains chamber 240 back in the reservoir in the event excessive pressure is established. Thus, as shown in FIG. 3, housing 174 is formed with an internal chamber 270 and there is a line 272 (drain) which communicates with the reservoir 212.

A sleeve 274 is positioned in chamber 270. A spring biased relief valve 276 is positioned in a bore in sleeve 274 and is normally closed on a port 278 formed in a plug 280, inserted in sleeve 274.

Plug 280 is provided with a transverse passage 282 which communicates port 278 with a transverse passage 284 in sleeve 274, which in turn communicates with chamber 270.

Thus, when check valve 276 is unseated by excessive pressure in chamber 270 it communicates chamber 270 with the drain passage 272 and any fluid in chamber 270 is returned to the reservoir.

Chamber 270 communicates by way of a passage (not shown) with chamber 240, FIG. 2, so that chamber 270 at all times is identified with the pressure prevailing in chamber 240 by which the brake actuator is serviced. In the event the pressure setting of valve 276 is exceeded (set by an adjusting screw and nut 288) the needle type check valve 276 is opened and the pumping piston, if operated, only returns fluid to the reservoir.

PRESSURE RELEASE CHECK VALVE

When the pump handle (lever 192, FIG. 3) is stowed in the position shown in FIG. 3, it activates a pressure release check valve to depressurize the pump.

The pressure release check valve is positioned below the pressure relief check valve as shown in FIG. 3. A sleeve 292 is positioned in a chamber 294 inside the pump housing. This chamber is closed at one end by a plug 296. A retainer spring 298 holds the sleeve 292 in place.

Sleeve 292 is formed with an internal bore 299 and cross passage 300 communicating with a passage 242 which communicates with pressure chamber 240.

A check valve cartridge 302 is located in bore 299 and presents a check ball normally seated by a spring.

A plunger 310 is located in the bore of a boss 312 provided on the pump housing, FIG. 3. The plunger has a stem 314 for disengaging the ball check valve 302 when the plunger 310 is moved to the right (FIG. 3) against the action of a return spring 316.

The lever 192 for reciprocating the pumping piston 196 is provided with a tapped opening 320 in which is located an adjusting screw 322 having a head 324 which engages plunger 310 in the course of stowing the handle. When the pump handle is located in home position, plunger 310 is actuated to open the check valve to depressurize chamber 240.

MODIFIED PUMPING PISTON

The pumping piston 196, FIG. 2, is balanced in that substantially the same force (about eighty pounds) is required to move the piston inwardly as well as outwardly. The effective area of the piston on the side opposite the rod is about twice the rod diameter.

The operating force may be considerably reduced by constructing the hand pump piston in the manner shown in FIG. 4 to include two check valves 450 and 452 and a rod 454 of reduced diameter compared to the one shown in FIG. 8. In FIG. 4 the effective area of the piston on the side opposite the rod is about four times the rod diameter. Both check valves are located in the piston head 456.

Valve 452 is a mere check valve, held seated by a spring as shown. A fluted or grooved button 458 is interposed between the spring and ball check 452, allowing fluid flow therepast toward rod 454 and opens when the piston is stroked to the right (to contract front chamber 208) corresponding to the upstroke of the pump handle.

Valve 450 on the other hand is a relief valve, normally held closed by a spring as shown, in which the spring setting is such that it opens only when a force of say more than forty pounds is required on the downstroke of the pump handle, moving the piston to the left. Otherwise ball check valve 450 remains closed to pressurize fluid in rear chamber 206 when the piston is stroked to the left. Again, a grooved button 460 permits fluid flow therepast into chamber 208.

Thus, at the point where the force on the downstroke reaches approximately forty pounds the pump piston relief valve 450 will open and limit the necessary handle force for operation. After this point, the downstroke no longer has an effect on the output pressure and the pump is single-acting.

The valve means thus described are positioned in respective passages in the piston head 456, respectively ported to the front chamber 208 as shown. The piston head is provided with a rear recess 462. The aforesaid passages are also ported to recess 462 which communicates with a passageway 464 axially in the piston rod 454, FIG. 4, which in turn is ported to the rear chamber 206 in the manner shown.

I claim:

1. In a hydraulic brake actuator, a manual hand pump having a pressure chamber to be pressurized with hydraulic fluid pumped thereto from a reservoir, and equipped with a double acting handle operated pump piston assembly having a rod and a piston head reciprocal in a cylinder to so pressurize a body of fluid by alternately contracting front and rear cylinder chambers located on opposite sides of the head of the piston, when the piston is moved in opposite directions inside the cylinder, the rear cylinder chamber being in communication with said pressure chamber through a check valve and the front cylinder chamber being in communication with the reservoir through another check valve: a pair of additional check valves and related passages carried by the piston head, one check of said additional valves and its passage allowing flow of pressurized fluid at the front chamber through the head of the piston and into the rear cylinder chamber on the rod side of the piston, and the other of said additional check valves and its passage allowing flow of pressurized fluid in the rear chamber at the rod side of the piston through the piston head to the front chamber only when the manual force required to operate the piston exceeds a predetermined minimum.

2. A pump piston assembly according to claim 1 in which each check valve is a ball check, and having a spring in each passage normally holding its ball check closed.

3. A hand pump according to claim 2 in which each of said related passages is in part presented by the groove of a grooved button incorporated in the piston head and interposed between the related ball check and spring, said piston head having a rear recess to which said related passages are both ported, said rear recess communicating with an axial passageway in the piston rod which in turn is ported to said rear cylinder chamber.

* * * * *

UNITED STATES PATENT AND TRADEMARK OFFICE
CERTIFICATE OF CORRECTION

PATENT NO. : 4,145,164
DATED : March 20, 1979
INVENTOR(S) : John E. Straut

It is certified that error appears in the above-identified patent and that said Letters Patent are hereby corrected as shown below:

Column 1, line 54, after "208" delete the semi-colon (;).

Column 4 lines 26 and 27 change "one check of said additional" to read --one of said additional check--.

Signed and Sealed this

Fourteenth Day of August 1979

[SEAL]

Attest:

Attesting Officer

LUTRELLE F. PARKER
*Acting Commissioner of Patents and Trademarks*